United States Patent [19]
Ooi et al.

[11] Patent Number: 5,007,088
[45] Date of Patent: Apr. 9, 1991

[54] SCRAMBLING/DESCRAMBLING METHOD USING A MEMORY FOR STORING INITIAL PSEUDO-RANDOM BIT PATTERNS RESPECTIVELY FOR SUBMULTIFRAMES

[75] Inventors: Tomoyuki Ooi; Toshinori Hotta; Yasuhito Isoe, all of Tokyo, Japan

[73] Assignee: NEC Corporation, Japan

[21] Appl. No.: 316,023

[22] Filed: Feb. 27, 1989

[30] Foreign Application Priority Data

Mar. 1, 1988 [JP] Japan ................................ 63-47902

[51] Int. Cl.$^5$ .............................................. H04L 9/00
[52] U.S. Cl. ....................................... 380/46; 380/49; 375/114; 370/105.1
[58] Field of Search ................. 380/46, 48, 49, 50; 375/114, 116; 370/100–108

[56] References Cited

U.S. PATENT DOCUMENTS

| | | | |
|---|---|---|---|
| 4,606,042 | 8/1986 | Kahn et al. | 380/48 |
| 4,663,501 | 5/1987 | Pospischil | 380/48 |
| 4,757,536 | 7/1988 | Szczutkowski et al. | 380/48 |
| 4,817,148 | 3/1989 | Lafferty et al. | 380/48 |

Primary Examiner—Thomas H. Tarcza
Assistant Examiner—David Cain
Attorney, Agent, or Firm—Laff, Whitesel, Conte & Saret

[57] ABSTRACT

In a communications system, a multiframe data signal is sent from a transmit end to a receive end of the system. The multiframe is composed of a series of submultiframes each containing a series of frames. Each frame in turn comprises a sync word for establishing the start timing of the frame, an identifier for uniquely identifying the submultiframe in which the frame is contained, and a specified number of data bits. A pseudo-random scrambling bit pattern, which repeats at intervals of multiframe and varies from one pattern to another at frame intervals, is generated as a scrambling bit pattern with which the data bits of each frame are scrambled prior to transmission. At the receive end, the sync word of each frame is detected to establish frame synchronization. A memory stores initial bit patterns each of which is identical to the pattern which was generated at the beginning of each submultiframe. The identifier is detected when frame sync is established and applied as a read address to the memory. The initial bit pattern of the submultiframe which is next to a one in which the establishment of frame sync occurred is read out of the memory into a pseudo-random sequence generator. The latter is activated at the beginning of the next submultiframe to generate a pseudo-random sequence, which successively varies at frame intervals and repeats the same pattern at multiframe intervals, for descrambling received data bits.

7 Claims, 3 Drawing Sheets

SCRAMBLING/DESCRAMBLING METHOD USING A MEMORY FOR STORING INITIAL PSEUDO-RANDOM BIT PATTERNS RESPECTIVELY FOR SUBMULTIFRAMES

BACKGROUND OF THE INVENTION

The present invention relates to scrambling/descrambling techniques for data transmission. The present invention is particularly useful for communications systems using pseudo-random bit patterns in which the same pattern appears recyclically at relatively long intervals.

According to a known scrambling technique, data bits are organized into successive frames of a multiframe format and the data bits of each frame are scrambled at a transmit end of a communications system with a pseudo-random sequence which varies with each frame and repeats the same pattern at intervals of multiframes. At the receive end of the system, the data bits of each frame are descrambled using the same pseudo-random bit pattern. However, if frame synchronization is established at the receive end at an intermediate point of a given multiframe, valid descrambling cannot take place until the beginning of the next multiframe. As a result, a substantial amount of data must be discarded even if the frame synchronization has been established. This problem is particularly acute when data transmission speed is relatively low, typically at 9.6 kbps, since the time taken to obtain the valid timing for descrambling is substantial.

SUMMARY OF THE INVENTION

It is therefore an object of the present invention to provide a scrambling/descrambling method which allows valid descrambling of data to occur immediately following the establishment of frame synchronization to prevent a substantial amount of data loss.

According to the present invention, a transmit end of a communications system successively generates a multiframe which is composed of a series of submultiframes. Each submultiframe contains a series of frames each comprising a sync word for establishing the start timing of the frame, an identifier for uniquely identifying the submultiframe in which the frame is contained, and a specified number of data bits. A pseudo-random scrambling bit pattern is generated, which repeats at intervals of multiframe and varies from one pattern to another at frame intervals. The data bits of each frame are scrambled with the scrambling bit pattern and transmitted together with the sync word and identifier to a receive end of the system. At the receive end, the sync word of each frame is detected to establish frame synchronization. A plurality of initial bit patterns are stored in a memory. Each initial bit pattern is identical to the pattern which was generated at the beginning of each successive submultiframe. The identifier contained in each frame is detected upon establishment of frame synchronization and applied to the memory to read the initial bit pattern of the submultiframe next to a submultiframe in which the establishment of frame synchronization occurred. The initial bit pattern read out of the memory is loaded into a pseudo-random sequence generator which is activated at the beginning of a submultiframe, so that it generates a descrambling bit pattern which successively varies at frame intervals and repeats the same pattern at multiframe intervals. The data bits contained in each of the syncestablished frames are descrambled with the descrambling pattern to recover the original data.

Since each initial bit pattern, which is identical to the pattern generated at the beginning of each submultiframe, is recalled from the memory according to the identifier of the submultiframe next to the submultiframe in which frame synchronization is established, valid descrambling can start immediately following the establishment of frame synchronization. As a result, a substantial amount of data, which would otherwise be lost with conventional scrambling/descrambling technique, can be saved.

BRIEF DESCRIPTION OF THE DRAWINGS

The present invention will be described in further detail with reference to the accompanying drawings, in which.

DETAILED DESCRIPTION

Figure 1:
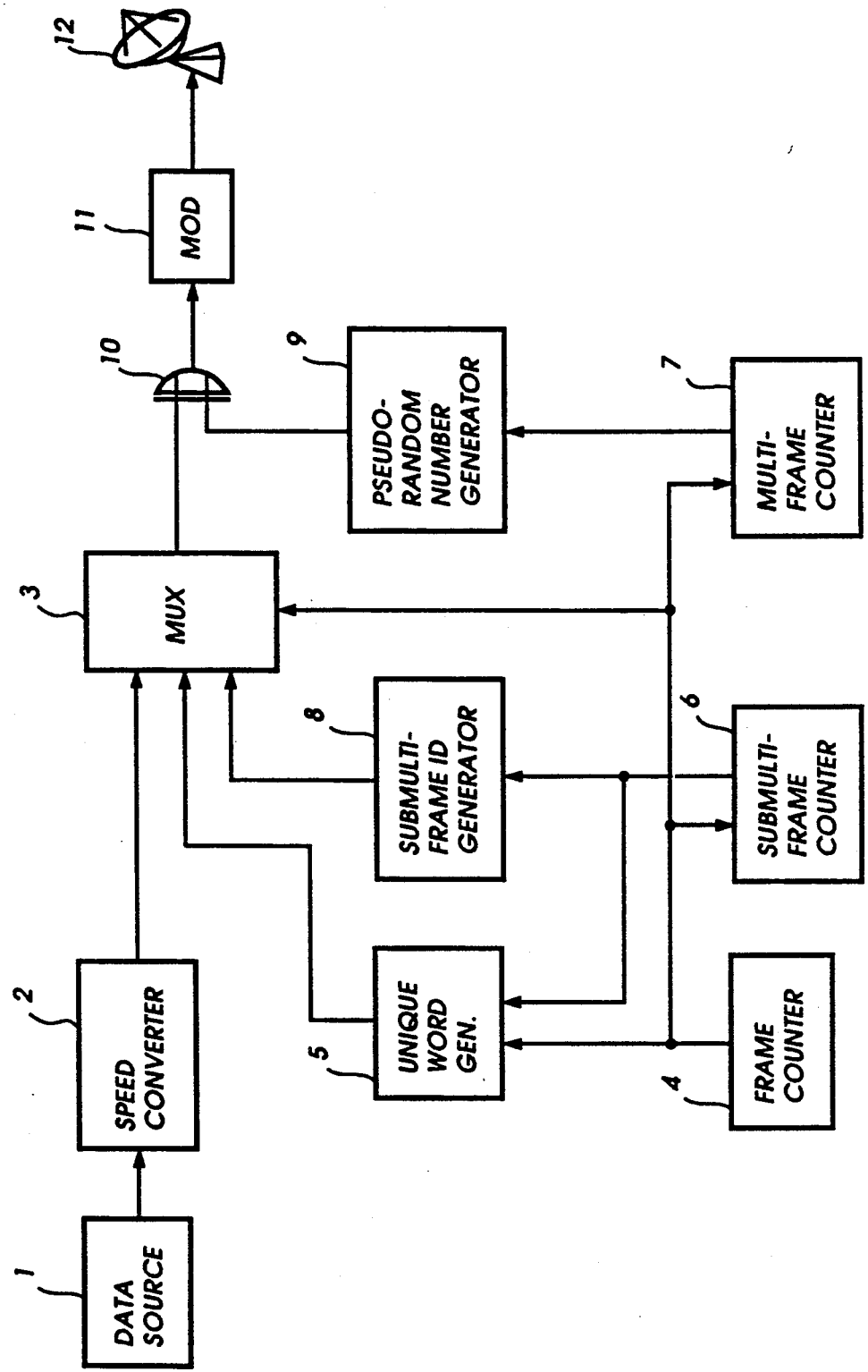
FIG. 1 is a block diagram of a transmitter of a satellite communications system.
Figure 2:
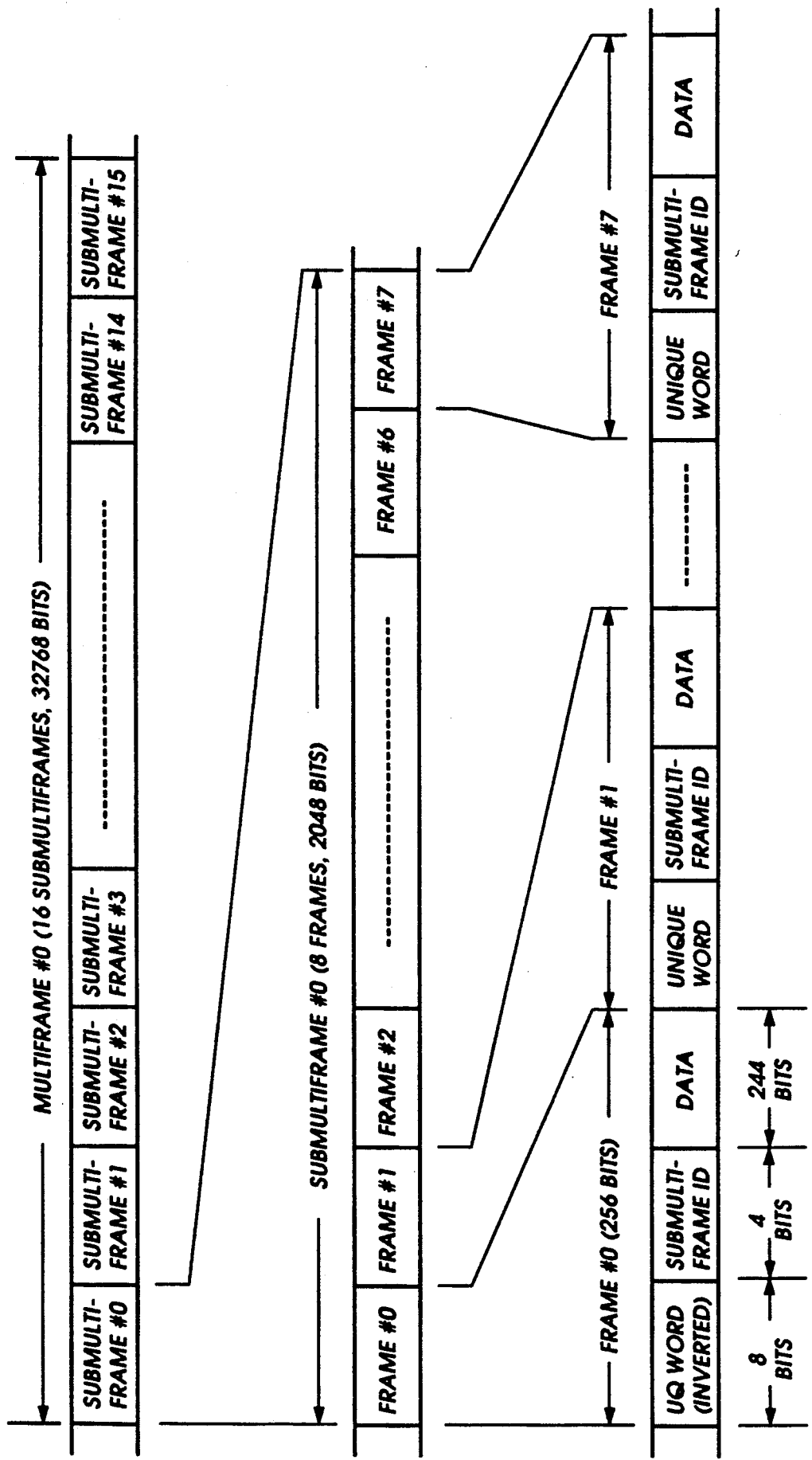
FIG. 2 is an illustration of a data format according to the present invention.

Referring now to FIG. 1, there is shown a transmission system of a satellite communications system according to a preferred embodiment of the present invention. In FIG. 1, an input data bit stream from a data source 1 is applied to a speed converter 2 where the time axis of the signal is compressed to allow overhead bits to be inserted to the data bit stream by a multiplexer 3. A 256-bit frame counter 4 counts a clock timing pulse from a clock source, not shown, and produces an output at frame intervals, or at every 256 clock pulses or bits. The output of this frame counter is applied to a unique word generator 5 and further to a submultiframe counter 6 and a multiframe counter 7. Unique word generator 5 produces an 8-bit unique word, or sync word to establish the start timing of each successive frame of 256-bit length. Submultiframe counter 6 produces an output pulse at intervals of eight frames of 2048-bit length each. In response to the output of this counter 6, a submultiframe identifier generator 8 generates a 4-bit code uniquely identifying each of sixteen submultiframes #0 to #15. The 8-bit unique word and the 4-bit submultiframe identifier are supplied to multiplexer 3 and multiplexed, or interleaved with every 244 bits of the input data bit stream to form the 256-bit frame as illustrated in FIG. 2. Thus, the 4-bit submultiframe identifier contained in each frame represents which of the #0 to #15 submultiframes the individual frame belongs to. Submultiframes #0 to #15 are grouped to form each successive multiframe by the multiframe counter 8 which generates an output pulse at every 16 submultiframes, i.e., at every 32,768 bits as illustrated in FIG. 2. To establish the start timing of each successive submultiframe, unique word generator 5 is responsive to the output of the submultiframe counter 8 to invert the 8-bit unique word at the beginning of each successive submultiframe.

To scramble the 244 data bits of each frame, a pseudo-random number generator 9 is connected to the output of multiframe counter 7 and a scrambler, or exclusive-OR gate 10 is provided to perform a modulo-2 summation on the data output of multiplexer 3 and a scrambling pattern of 244-bit pseudo-random sequence generated by the pseudo-random number generator 9. Specifically, pseudo-random number generator 9 is initialized in response to the output of multiframe counter 7 to generate the initial value of 244-bit successive sequences whose bit patterns vary randomly at each successive frame and repeats an identical bit pattern at intervals of multiframe. The multiplexed overhead bits of each frame are combined in the exclusive-OR gate 10 with a 12-bit sequence of binary 0's from the pseudo-random number generator 9 in order to pass the overhead bits unmodified to a modulator 11, while the data bit stream of each frame is scrambled by the exclusive-OR gate 10 using each of the successively varying random patterns. The output of exclusive-OR gate 10 is modulated upon a satellite uplink carrier by the modulator 11 and fed to an earth station antenna system 12 for transmission to a satellite transponder, not shown.

Figure 3:
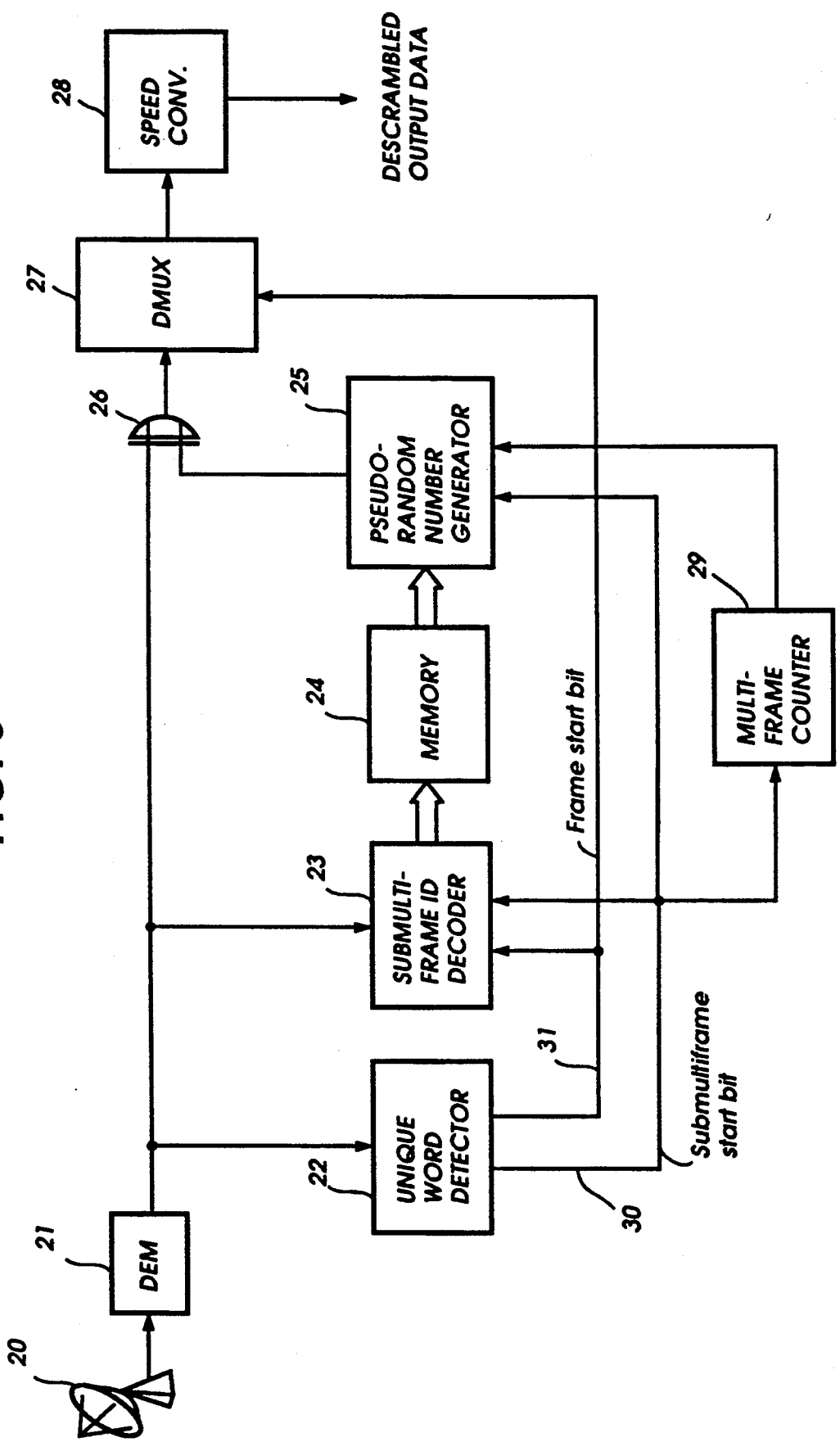
FIG. 3 is a block diagram of a receiver of the satellite communications system.

A receiving system of the satellite communications system is shown in FIG. 3. The downlink signal from the satellite transponder is received by an antenna 20 of the receiving system and fed to a demodulator 21 to recover the original baseband signal, i.e., the scrambled data bit stream of multiframe format. A unique word detector 22 and a submultiframe identifier decoder 23 are connected to the output of demodulator 21. Unique word detector 22 detects the first, or inverted unique word and applies a multiframe start bit to a first output line 30 to establish the start timing of each submultiframe and detects each subsequent unique word and applies a frame start bit to a second output line 31 to establish the frame start timing. Submultiframe identifier decoder 23 is synchronized with the frame start timing to detect the 4-bit submultiframe identifier contained in each successive frame. The detected identifier is supplied to a memory 24 as a read address. This memory stores a plurality of initial bit patterns of pseudo-random sequences. Each of the stored initial bit patterns is identical to the pattern which was generated by the pseudo-random number 9 of the transmitter at the beginning, or #0 frame of each submultiframe. The application of the read address to memory 24 reads out the initial bit pattern of a submultiframe which is next to one in which frame synchronization is established. The initial bit pattern recalled from the memory 24 is loaded into a pseudo-random number generator 25 as an initial pseudo-random value. This pseudo-random number generator is activated in response to the submultiframe start bit on line 30 to start generating a pseudo-random sequence. Therefore, the pseudo-random sequence begins with the loaded value at the beginning of the next submultiframe immediately following the establishment of frame synchronization and varies at frame intervals, generating 244-bit pseudo-random sequences, respectively, for #0 to #7 frames of each successive submultiframe. The submultiframe start bit is also applied to a multiframe counter 29 to generate a start bit signifying the start timing of each multiframe. This multiframe start bit is applied to the pseudo-random number generator 25 to permit it to continue generating the pseudo-random sequences at multiframe intervals (at intervals of 32,768 bits).

The output of pseudo-random number generator 25 is applied as a descrambling bit pattern to one input of a descrambler, or exclusive-OR gate 26 to descramble the data bits of each frame. The descrambled data bits are applied to a demultiplexer 27 to deinterleave them from the overhead and applied to a speed converter 28 where the time axis of the signal is expanded to the original scale.

Assume that frame synchronization is established on receipt of frame #1 of submultiframe #1, for example. An initial bit pattern, which is identical to the one generated for the #0 frame of the #2 submultiframe, is read out of memory 24 in response to start bits appearing on lines 30 and 31 in the first frame of submultiframe #2 and loaded into the pseudo-random number generator 25. In response to the submultiframe start bit pulse, the pseudo-random number generator 25 generates 244-bit pseudo-random sequences beginning with the loaded bit pattern. Although the data bits of frames #1 to #7 of submultiframe #1 are not descrambled correctly and lost, valid descrambling occurs in the received bit stream beginning with the first frame of submultiframe #2. Therefore, the scrambling/descrambling technique as taught by the present invention immediately occurs following a submultiframe in which frame synchronization is established, thus saving a substantial amount of data which would otherwise be lost with conventional descrambling techniques.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for scrambling data bits at a transmit end of a communications system and descrambling the data bits at a receive end of the communications system, comprising:
   (a) successively generating a multiframe composed of a series of submultiframes each containing a series of frames, each of said frames containing data bits, and a sync word for establishing the start timing of the frame, at least one of said frames of each submultiframe containing an identifier for uniquely identifying each of a plurality of specified time points of said multiframe;
   (b) generating a pseudo-random number (PN) sequence periodic with a period of said multiframe;
   (c) scrambling said data bits of each frame with said PN sequence to said receive end of;
   (d) receiving said transmitted frames at said receive end and establishing frame synchronization with the received frames in response to said sync word contained in each of the received frames;
   (e) storing a plurality of portions of said PN sequence in a memory, each of said portions being identical to a portion of the PN sequence which was generated at a predetermined point of each transmitted submultiframe;
   (f) detecting the identifier from each submultiframe;
   (g) reading one of said portions of PN sequence from said memory in accordance with said detected identifier;
   (h) generating a PN sequence periodic with a period of said multiframe beginning with said portion read out of said memory; and
   (i) descrambling the scrambled data bits contained in each of said sync-established frames with said PN sequence generated by the step (h).

2. A communications system comprising:
   means for successively generating a multiframe composed of a series of submultiframes each containing a series of frames, each of said frames containing data bits, and a sync word for establishing the start timing of the frame, at least one frame of each submultiframe containing an identifier for uniquely identifying each of a plurality of specified time points of said multiframe;

first pseudo-random number (PN) sequence generator means for generating a PN sequence periodic with a period of said multiframe;

means for scrambling said data bits of each frame with said PN sequence for transmission to a receive end of said system together with said sync word and identifier;

means responsive to said sync word contained in each frame for establishing frame synchronization therewith;

a memory for storing a plurality of portions of said PN sequence each being identical to a portion which was generated at a predetermined point of each submultiframe by said first pseudo-random sequence generator means;

means for detecting said identifier and reading one of said portions of PN sequence from said memory in accordance with said detected identifier;

second pseudo-random sequence generator means arranged to be loaded with said portion read out of said memory for generating a PN sequence periodic with a period of said multiframe beginning with said loaded portion; and means for descrambling the scrambled data bits contained in each of the sync-established frames with said PN sequence generated by the second PN sequence generator means.

3. A communications system as claimed in claim 2, wherein said identifier is inserted at the beginning of each submultiframe and, wherein the sync word of one of said frames which occurs at the beginning of each submultiframe has a bit pattern which is inverse to the bit pattern of the sync words of the other frames.

4. A communications system as claimed in claim 3, wherein said multiframe generating means comprises:

unique word generator means for generating said sync word of a first pattern at intervals of said submultiframes and generating said sync word of a second pattern at intervals of said frames;

identifier generator means for generating said identifier for each of said submultiframes at intervals of said submultiframes; and means for interleaving said sync word and said identifier with said data bits to form said frames, further comprising unique word detector means for detecting said sync word of said first pattern, and wherein said second pseudo-random sequence generator means is arranged to be reset to said portion of the PN sequence read out of said memory in response to the detected sync word to begin generating said PN sequence.

5. A descrambler for receiving a multiframe composed of a series of submultiframes each containing a series of frames, each of said frames containing data bits, and a sync word for establishing the start timing of the frame, at least one the frames of each of said submultiframes containing an identifier for uniquely identifying the submultiframe in which the frame is contained, said data bits of each frame being scrambled with a pseudo-random number (PN) sequence periodic with a period of the multiframe, said descrambler comprising:

a memory for storing a plurality of portions of said PN sequence each of said portions being identical to a portion of the PN sequence which is to be generated at a specified point of each submultiframe;

means responsive to said sync word contained in each frame for establishing frame synchronization therewith;

means for detecting said identifier from each submultiframe and reading one of said portions of the PN sequence from said memory in accordance with said detected identifier;

pseudo-random sequence generator means arranged to be loaded with said portion read out of said memory for generating a PN sequence periodic with a period of said multiframe beginning with said loaded portion; and means for descrambling the scrambled data bits contained in each of the sync-established frames with said PN sequence generated by said pseudo-random random sequence generator means.

6. A communications system as claimed in claim 2, wherein said identifier uniquely identifies each of said submultiframes.

7. A descrambler as claimed in claim 5, wherein said identifier uniquely identifies each of said sumbultiframes.

* * * * *